(12) United States Patent
Boys et al.

(10) Patent No.: US 6,459,218 B2
(45) Date of Patent: Oct. 1, 2002

(54) INDUCTIVELY POWERED LAMP UNIT

(75) Inventors: John Talbot Boys; Andrew William Green, both of Auckland (NZ)

(73) Assignee: Auckland UniServices Limited, Auckland (NZ)

(*) Notice: Subject to any disclaimer, the term of this patent is extended or adjusted under 35 U.S.C. 154(b) by 0 days.

(21) Appl. No.: 09/780,517

(22) Filed: Feb. 12, 2001

Related U.S. Application Data (63) Continuation of application No. 08/793,303, filed as application No. PCT/NZ95/00061 on Jul. 11, 1995.

(30) Foreign Application Priority Data

Jul. 13, 1994 (NZ) ................................................. 264000

(51) Int. Cl.⁷ ............................................... H05B 37/00
(52) U.S. Cl. ...................... 315/324; 315/349; 315/344; 315/236; 315/250
(58) Field of Search ................................ 315/324, 344, 315/346, 267, 276, 349, 236, 254, 255, 326, 250

(56) References Cited

U.S. PATENT DOCUMENTS

| | | | |
|---|---|---|---|
| 2,139,815 A | * 12/1938 | Fodor | 315/246 |
| 2,265,475 A | * 12/1941 | Fodor | 315/255 |
| 3,611,021 A | * 10/1971 | Wallace | 315/239 |
| 3,873,884 A | 3/1975 | Gabriel | 315/267 |
| 4,595,864 A | * 6/1986 | Stiefelmeyer et al. | 315/246 |
| 4,904,998 A | * 2/1990 | Niimi | 340/908.1 |
| 4,914,539 A | 4/1990 | Turner et al. | 361/18 |
| 5,293,308 A | * 3/1994 | Boys et al. | 363/37 |

FOREIGN PATENT DOCUMENTS

| | | |
|---|---|---|
| WO | 93/04527 | 3/1993 |
| WO | 93/23907 | 11/1993 |
| WO | 95-11544 | 4/1995 |
| WO | 95/11545 | 4/1995 |

* cited by examiner

Primary Examiner—Michael B Shingleton
(74) Attorney, Agent, or Firm—Young & Thompson (57) ABSTRACT

An inductively powered lamp unit 806 is fixed onto a substrate and over a position where a primary inductive loop 803 is spread apart (as at 807). At such sites, a horizontal (or at least parallel to the surface of the substrate) component of alternating magnetic flux is available. The conductors of the loop 802–803 can be inserted in a slit 804 cut into the substrate. The spreading apart of the conductors may be ensured with a spreader 808. A power supply 801 may be a resonant supply operating at 40 kHz. The lamp unit 806 does use a resonant pickup coil which can be shorted so as to minimize coupling, and provide supply regulation. The lamp unit can be controlled by signals transmitted over the primary loop. Applications include roadway markers and fire escape egress indicators, and underwater lighting.

7 Claims, 5 Drawing Sheets

INDUCTIVELY POWERED LAMP UNIT

RELATED APPLICATION

This application is a continuation of application Ser. No. 08/793,303, filed on Mar. 12, 1997. Application Ser. No. 08/793,303 is the national phase of PCT International Application No. PCT/NZ95/00061 filed on Jul. 11, 1995 under 35 U.S.C. § 371. The entire contents of each of the above-identified applications are hereby incorporated by reference.

TECHNICAL FIELD OF THE INVENTION

This invention relates to the field of electrically driven lighting, to means for driving one or more lamps using inductive power transfer, and more particularly but not exclusively to the provision of emergency lights, indicating lights, and roadway signal lighting powered from adjacent concealed cables.

BACKGROUND

Transmission of electrical power to articles which consume power over significant gaps by means of inductive power transfer has become increasingly feasible with developments in resonant primary and resonant secondary conductors, means to control and limit the resonant secondaries, and suitable energising power supplies.

There are a number of applications where even a fixed source of light is advantageously driven by an inductively powered source, rather than by simple direct connections using conductive materials.

In most of the situations below, some of which are particularly adverse for conventional lighting, a particularly reliable lighting source is an advantage and in most of these situations the nature of inductive powering of lights will inherently enhance the reliability of a system over that using alternative power supplies such as direct connections, internal batteries, or solar cells with rechartable batteries. Some situations include:

where electrical isolation is necessary, as in lights used in or near water such as in swimming pools or areas where people work in contact with water, where corrosive or conductive fluids are likely to occur, where sparks may cause explosions, as in coal mines and in operating theatres or in certain other industrial sites where flammable powders, gases, or the like are found, where the added robustness of buried cables assists in maintaining power transfer during exceptional circumstances, where a surface on which lights are laid is prone to be replaced, such as on a roadway with a tar sealed surface.

In our U.S. pat. 5,293,328 we describe an inductive power transfer system having particular application to a multiplicity of vehicles.

OBJECT

It is an object of the present invention to provide an improved system for the inductive transfer of electrical energy to a source of light or one which will at least provide the public with a useful choice.

STATEMENT OF THE INVENTION

In one aspect the invention provides an inductively powered lamp unit; the lamp unit including one or more lamps capable of radiating light and comprising means to collect inductively transferred power from an external alternating primary magnetic field; said collection means comprising a resonant circuit having a resonant period and including at least one inductance and at least one capacitance; wherein the at least one inductance has a winding adapted to be intersected by a portion of the alternating magnetic field and thereby collect power as a secondary current, means capable of limiting the maximum amount of secondary current circulating in the resonant circuit, means to transfer power at an output from the resonant circuit to the lamp or lamps, and means to control the power provided to the lamp or lamps.

Preferably the means capable of limiting the amount of secondary current circulating in the resonant circuit comprises a shorting switch capable of closing a connection across the inductance; the shorting switch being controlled by a controller provided with means capable of sensing the magnitude of the output so that when the output exceeds a first, higher, predetermined threshold the shorting switch is closed for a period exceeding the resonant period of the circuit, or when the output falls below a second, lower, predetermined threshold the shorting switch is opened;

thereby limiting the secondary current flowing in the resonant circuit so that any magnetic flux generated by the secondary current does not have a significant counteracting effect on the primary field and so that the output of the resonant circuit is not able to exceed a predetermined maximum.

Preferably the means capable of sensing the magnitude of the output is configured so as to sense an output current.

Alternatively the means capable of sensing the magnitude of the output is configured so as to sense a relative or absolute output light intensity.

Preferably the resonant inductance comprises one or more coils, each coil being wrapped around an elongated member composed of a ferromagnetic material having a midpoint, which member is orientated when the lamp unit is placed in position so as to lie with its midpoint substantially adjacent to a primary conductor (capable when energised of radiating a primary field), and substantially at right angles to the direction of the primary conductor.

Preferably the lamp unit has a low profile and at least one window capable of transmitting light; the unit being capable of being attached to the surface of a roadway; and wherein the lamp or lamps comprise one or more light-emitting diodes.

It is also preferable that the lamp unit is packaged in a strong housing having a low profile and at least one window capable of transmitting light; the unit being capable of being attached onto the surface of a roadway, capable of withstanding loads applied by a road vehicle driving over it, and not capable of adversely affecting the integrity of the road vehicle nor deflecting the road vehicle from its course.

Preferably the lamp unit also includes at least one retroreflector unit for passively reflecting the light of vehicle beams.

In another aspect the invention provides a lighting installation comprising one or more inductively powered lamp units as described above, each affixed to a surface of a substrate, each lamp unit being capable of emitting light on being energised by inductive transfer of power across a space from a primary conductor located beneath the surface of the substrate; the primary conductor carrying, when in use, an alternating current.

Preferably the primary conductor radiates an external alternating magnetic field, at a frequency which is substantially the same as the resonant circuit in at least one of the lamp units; the frequency lying in the range of between 200 Hz and 2 MHz.

Preferably the primary conductor is laid down within a substrate in the topology of a loop, connected at a first open end to a power supply and having a second, closed end, the loop comprising a pair of closely spaced conductors, though spread apart in an axis substantially perpendicular to the surface of the substrate at each site where a lamp unit is to be placed.

Preferably the one or more inductively powered lamp units are placed upon the substrate so as to guide a moving person (whether on foot or steering a vehicle) to pass along a particular route.

Preferably one or more lamp units may be selectively addressed using the primary conductor as a medium, so that the light radiated therefrom may be changed from time to time.

Preferably selective addressing is accomplished by superimposing a message over the primary current, in the form of momentary variations of the amplitude of the primary current.

Preferably selective addressing is accomplished by superimposing a message over the primary current, in the form of momentary variations of the phase of the primary current.

Preferably selective addressing is accomplished by superimposing a message over the primary current, in the form of information carried within a carrier frequency, separate from the frequency of the power for inductive transfer.

Preferably selective addressing is accomplished by setting the frequency of the primary current so as to match the resonant frequency of the resonant circuit of the addressed one or more lamp units which, for this purpose, may each be provided with one of a variety of resonant frequencies.

In another aspect the invention provides an installation for laying out marking lights on a road, comprising a set of inductively powered roadway markers, a primary energising loop cable, and a power supply.

Preferably the power supply is capable of energising the primary energising loop in response to an external triggering event.

Preferably the power supply is capable of remotely controlling one or more lamp units by means of the primary energising loop.

Preferably the power supply is capable of remotely controlling one or more lamp units by means of the primary energising loop in response to an external triggering event.

In another aspect the invention provides an installation for laying out marking lights along a fire escape route or egress route in relation to a building, comprising a set of inductively powered lamp units, a primary energising loop cable capable of being buried within a substrate of the building, and a power supply having a battery backup; the installation being capable of being activated during an emergency.

Preferably the primary alternating current is a sine wave.

Preferably it has a frequency in the range of from 500 Hz to 1 MHz, although more preferably it has a frequency in the range of from about 10 KHz to about 50 KHz.

Preferably the alternating current is generated within a resonant power converter.

Preferably the concealed primary cable is electrically insulated and mechanically protected by being embedded within the substrate. Optionally it may be sealed into a slit cut into the substrate with a circular saw or the like.

Preferably the concealed cable comprises a pair of conductors orientated substantially perpendicular to the surface of the substrate, although optionally a pair of conductors may lie side by side within parallel slits. Preferably the cable is composed of a litz wire or other wire having a high surface-to-volume ratio such as a strip.

In another aspect the invention provides a lamp unit within a strong housing, comprising a resonant secondary or pickup coil and capacitor, one or more light-emitting lamps, and optionally power conditioning means.

Optionally the lamp unit has a low profile and may be applied to a road surface.

Optionally the lamp unit also contains one or more retro-reflector modules.

Preferably the power conditioning means comprises a current limit and optionally this may be built into light-emitting diodes or be an intrinsic property of metallic filament lamps.

In the case of light-emitting diodes, a pair of lamps or of banks of lamps may be connected in inverse parallel in order to utilise both half-cycles of an AC waveform.

In a further aspect the invention may provide a road-markings set of lamps comprising a series of lamp units, an embedded cable, and a power supply.

Optionally this invention may be used to highlight dangerous portions of a highway.

Optionally it may be energised by the proximity of a vehicle.

In a related aspect the invention provides a pedestrian crossing, comprising means to detect the presence of a waiting pedestrian, sets of road markings, and a sequencer to energise the road markings lamps for a period of time before signalling to the pedestrian that a warning has been given.

In a yet further aspect the invention may provide a fire escape indication set of lamps.

Preferably the power supply for the invention is driven from a set of storage batteries so that it can operate in the at least temporary absence of a mains supply.

DRAWINGS

The following is a description of a preferred form of the invention, given by way of example only, with reference to the accompanying diagrams.

PREFERRED EMBODIMENTS

One application of this invention is for 'self-illuminated "cats-eye style" roadway reflectors'. This specification describes an installation for laying out a series of marking or warning lights (which may also include retro-reflectors) along a generally linear course, and particular applications for these lights include roadway lighting. Here they may be substituted for the well-known "cats-eye" retro-reflectors which are placed upon the road and being of low profile, may be driven over. Many applications beyond the known range of uses for "cats-eye" reflectors become available for a system of self-powered units.

In relation to another application; fire egress lighting, the type of energisation used in this invention offers advantages over conventional lighting in that the invention is more resistant to fire damage than other types of emergency guidance and therefore will persist for a longer time.

We shall describe a basic type of light unit and cabling, (Example 1) and a more advanced type of light unit (Example 2) as reduced to practice, but it should be realised that these examples are in no way limiting and that further examples, exploiting the characteristic features of the invention, may become obvious to the skilled reader.

In principle, we feed alternating current at preferably about 36–40 KHz and at a sufficient current (typically 10–12A) into a cable buried within the substrate of the road or building or the like, and provide radiated magnetic flux from the cable at discrete sites for use in energising lamp units adapted for using inductive power transfer. Although it is convenient and effective to use resonating current and a resonant power supply to power the primary inductive loop (the cable) power of similar characteristics could be generated in other ways.

Principles of resonant pickup of inductive power do apply for effective operation of the lamp units and the Examples illustrate this.

EXAMPLE 1

Our most basic system comprises:
(a) A power supply 200, generating a sine-wave output of a desired power level at usually around 40 KHz into a (mainly inductive) resonating cable 201, and in the applications described herein here at a power level of perhaps up to 100–200 watts although much higher levels can be generated.
(b) A cable 201 of up to 800–1000 m length having closed-loop topology which is placed alongside the intended position of a or each lamp unit 203, 204. We prefer to use litz wire in installations where efficiency and long-term reliability at high loading levels is important, although for cheapness ordinary insulated copper (or aluminium) cables can be used.
(c) One or more lamp units 203, 204, 100, laid out in a series like a chain, each of which units comprises a pickup coil preferably resonant at the power supply frequency, one or more lamps, and preferably power conditioning means. We generally prefer light-emitting diodes as they are reliable.

The cable can be laid out as a single U-shaped loop or can be run out along several branches, though preferably as a single length without joins. A particular application may require tuning, as only one length has the correct resonant frequency and for this purpose the installer can either vary the resonating capacitors within the power supply or add toroids (including air gaps) over the cable to artificially increase its inductance and thereby simulate a longer cable than is actually present. We prefer to run the cable at a low power and at a low voltage, for safety's sake.

As there are no exposed metallic conductors in an inductively powered lighting system, it may be used for long periods in a corrosive atmosphere or one where seawater is present. The relative absence of risk of sparks allows its use in inflammable or explosive situations.

Figure 1:
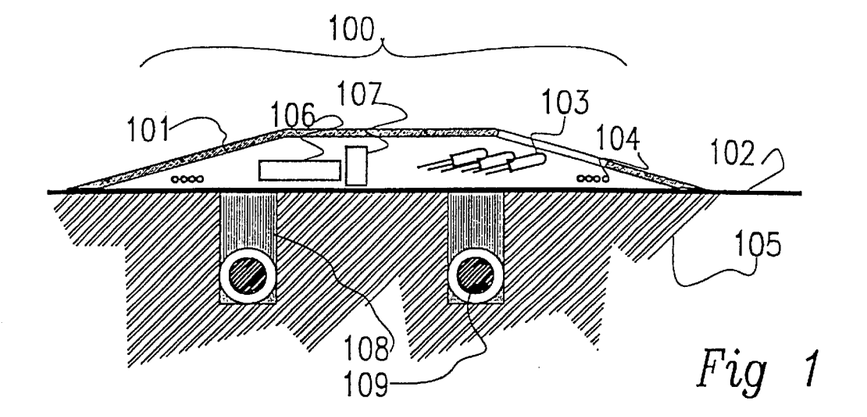
FIG. 1: is an illustration of a section through a light housing above a pair of primary conductors embedded in a substrate.

FIG. 1 illustrates the road warning lamp 100 of Example 3 in place on a road surface 102. In this drawing we have shown the energising cables 109 in a parallel pair of slits 108, although roading engineers prefer a single slit as 302 in FIG. 3. The lamp 100 comprises a tough housing 101, having a clear or translucent window in front of an array of lights or preferably light-emitting diodes 103. These diodes derive their power from a secondary pickup coil 104 which is made resonant at about the preferred operating frequency by a capacitor 106, and the lamps are driven through a rectifier module 107. The slits 108 in the roadway 102 are preferably filled with a matrix. FIG. 3 illustrates the vertical wiring alternative, in which the secondary coil 304 is placed above the slit 302 containing the pair of wires 305. Preferably the slit is cut deeper at about the intended position of each lamp unit 306, so that one of the cables 308 may be brought deeper and so increase the inductive field available at that point. Between lamp units, the cable 305 has a reduced inductance where its conducting members are closer together and so an increased length of cable can be driven with a limited voltage. A further way to enhance the magnetic flux at a lamp site is to use a ferrite rod or peg as at 205 in FIG. 2. This may limit the freedom of placement of lamp units. Ferrite may be incorporated within lamp units, as suggested by the core of the inductor 401. At least one conductor may, instead of being litz wire, be a flat strip of metal, as this will raise the amount of surface available for carrying skin-effect currents.

Figure 4:
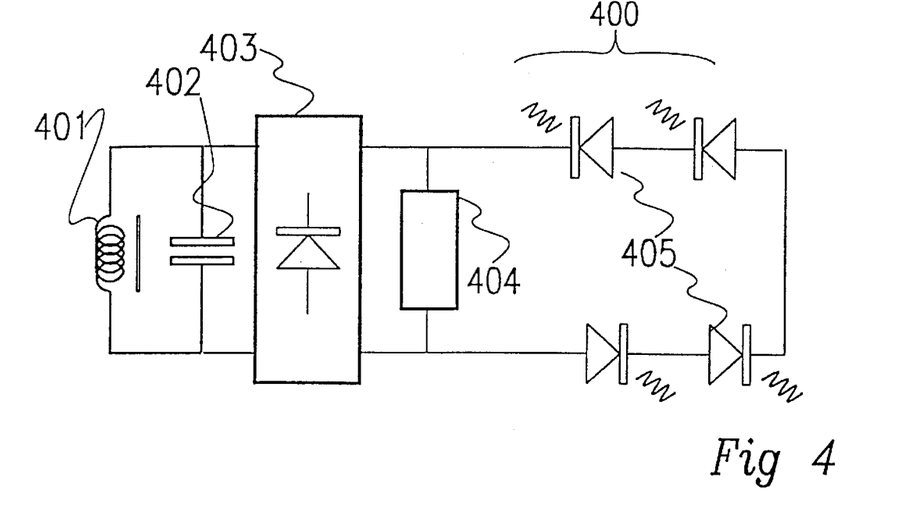
FIG. 4: shows a typical circuit for use in a light housing of the present invention.

FIG. 4 shows one preferred circuit, in which 401 and 402 comprise a resonant circuit, 403 is a rectifier to make a DC voltage, and 405 is a set of LED lamps in series. 404 may be a shunt regulator acting as a current limiter, or a flasher module. Preferably, 404 is a repetitively acting shorting switch (see 503 with 501, 502 in FIG. 5). If a current limiter is not used, the operating current in the lamps may be set to the usual preferred value of around 20 mA by choosing from a range of lamp units or placing a lamp unit so as to give a predetermined brightness.

EXAMPLE 2

This portion of the specification describes a preferred inductively powered lamp unit. There are two versions, shown as FIG. 5 (no ability for external control) and FIG. 6 having internal means for detecting and responding to control impulses. Certain parts of these two circuits have been discussed in relation to FIG. 4.

Figure 5:
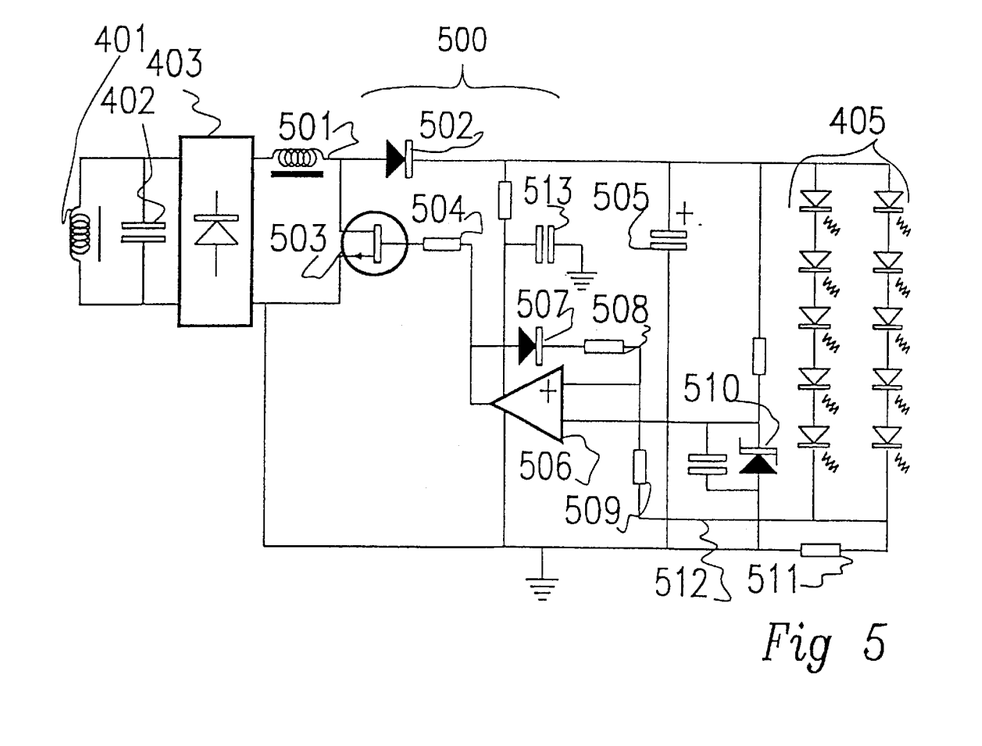
FIG. 5: shows a preferred circuit including control of the resonant pickup circuit.

The non-controlled circuit is shown as 500 in FIG. 5. The resonant pickup coil 401 may actually comprise two coils 704 (as in FIG. 7) wound around each ferrite strip 703, and if several coils are used they are placed in series. The capacitor(s) of the resonant circuit are shown at 402; here 247 nF and including provision (pads) on the circuit board for adding a small "tuning" capacitor. The resonant frequency is at about 40 KHz. The bridge rectifier 403 is made up of four diodes (type BAT83), the output of which is passed through an inductor 501 (7.5 mH) and through a steering diode 502 (BAT83) to charge a capacitor 505 (33 FF, 25V). Power FET transistor 503 (type IFRD110) is used as a shorting switch to short out the resonant circuit from time to time, each time lasting for a number of cycles. Means to control the shorting switch comprise the operational amplifier/comparator 506 (type MC33171) which has at its inverting input a zener diode 510 (type TC9491) as a voltage reference. The comparator compares the zener voltage with a proportion of the current passed through the output lamps at resistor 610 (30 ohms) (via a 1K resistor 509) and uses a diode 507 (type BAT83) in series with a 68K resistor 508 as a non-inverting feedback loop, for hysteresis. This control circuit provides a controlled current centered on a design value and fluctuating to a small extent about that value when the resonant circuit is alternately shorted, then allowed to charge the capacitor 505. Typically, there are about 500 shorting events per second.

Providing current regulation of this type allows the lamp unit to emit substantially a controlled amount of light regardless of its position, within limits. Exact placement is not critical. It is not uncommon for a marker on a hot, tar-sealed road to be displaced laterally by tires of heavy vehicles and this regulation provides some tolerance to displacement after positioning.

In our preferred circuit two chains (405) of high-intensity (orange) light-emitting diodes (type HLMT-CL00) are used to radiate light to one side of the lamp unit. Of course, other colours could be used.

Variations to FIG. 5 include (for example) monitoring the ambient light with a light-dependent resistor, so that the brightness of the marker is proportional to daylight, or regulating current in terms of actual light output rather than lamp current.

Figure 6:
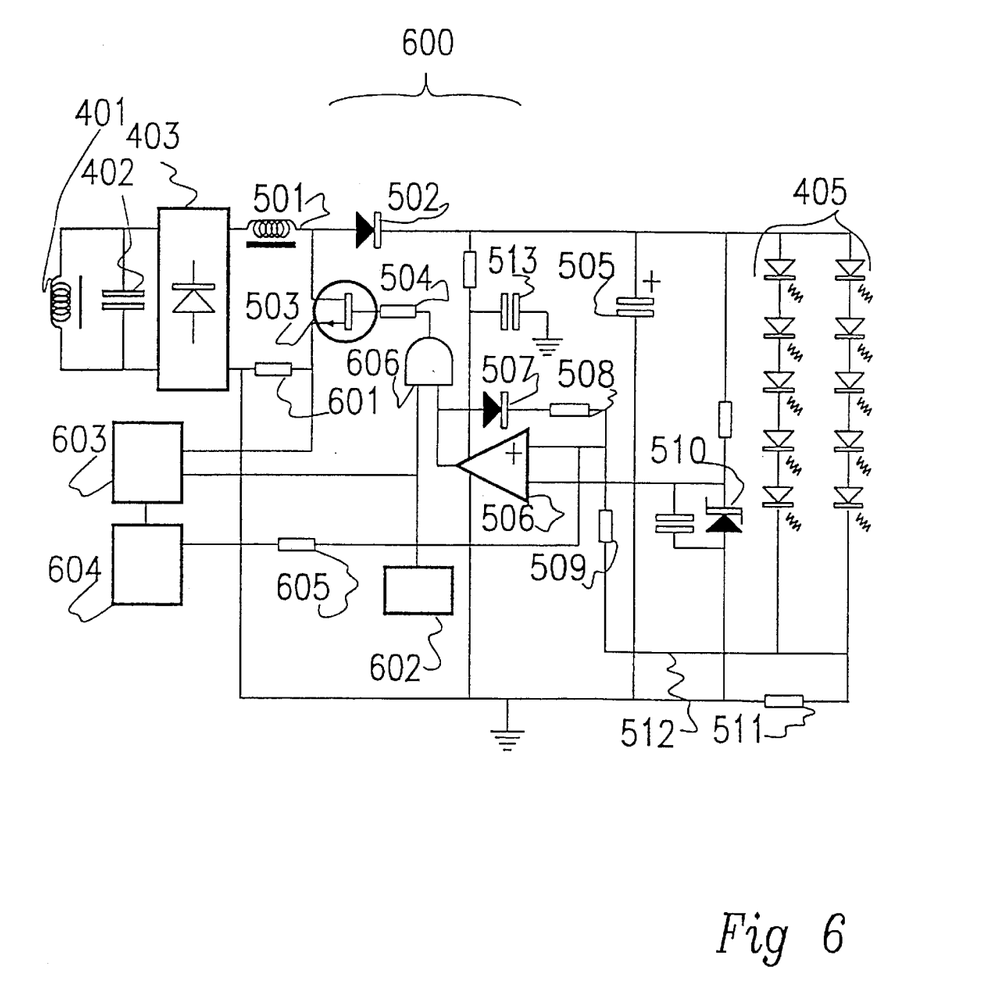
FIG. 6: shows a preferred circuit like FIG. 5, also including means for detecting and responding to control impulses.
Figure 10:
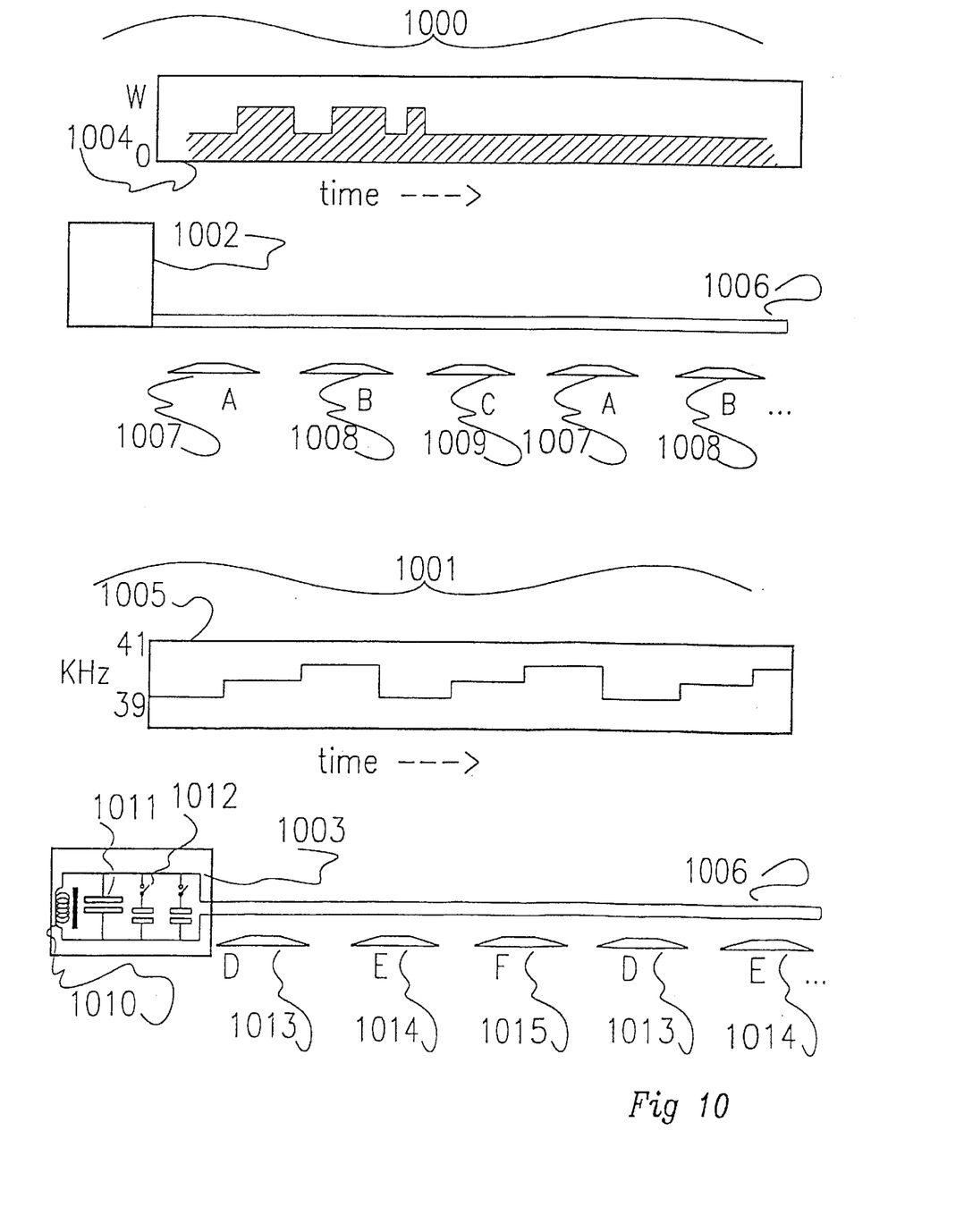
FIG. 10: shows options for controlling the output of individual lamp units by way of currents within the primary conductor.

FIG. 6 illustrates one means 600 for rendering the circuit capable of being externally controlled. As suggested in FIG. 10, it is possible to superimpose control signals over the resonant power circulating in the primary loop. This circuit is well-adapted for control by means of low-frequency tones or dual tones. FIG. 6, which is a development of FIG. 5 and includes the components of FIG. 5, also includes means to short-circuit the pickup coil 401 from time to time (typically once per millisecond) and during that time read the current circulating in the primary loop. This circuit is tentative because it appears that an application-specific integrated circuit will be an appropriate implementation.

Box 602 represents a clock generator producing a pulse of 50 Fsec every 1 msec. (There is no requirement to synchronise all clocks in all markers in an installation to pulse synchronously). Its output is passed to (a) an AND gate 606 shared by the comparator and supplying the gate of the power FET, 503. Its output also goes to the control input of a sample and hold circuit 603, which reads the current across a current sense resistor 601 inserted in the source lead of 503. At times when the switch 503 is closed, the resistor will, after a cycle or two at 40 KHz, or about 50 Fsec, have a voltage on it representing the current in the primary inductive loop at that time. This voltage is taken to the signal input of the sample and hold circuit, and the output is passed to a circuit 604 which comprises a tone detector.

In this simple example we have provided a resistor 605 between the tone detector output and an input of the comparator, so that activation of the tone detector has an effect on the setting of the comparator 506 and the mean brightness of the lamps is altered as a result of detecting a specific tone carried within the primary inductive loop. "Stealing time" from the action of the comparator as for FIG. 5 is of little moment because the inherent regulation can compensate. Repetitive sampling at a rate of about 1 KHz will satisfy the Nyquist criterion for control signals which are single or multiple tones of up to about 250 Hz.

Clearly there are many possible options; such as whether or not the tone detector outputs switch from one state to another state on each tone detection, or change state only during a tone, and there may be more than one tone and hence more than one action, or the detector output may be treated as a code signal passed to a microprocessor which will execute one of a series of actions on the light output from the lamps 405. There may be a red series and a yellow (or orange, green or blue or even infra-red) series of lamps which can be driven separately, or separately controllable lamps may face in various directions.

HIGHWAY MARKERS

Figure 7:
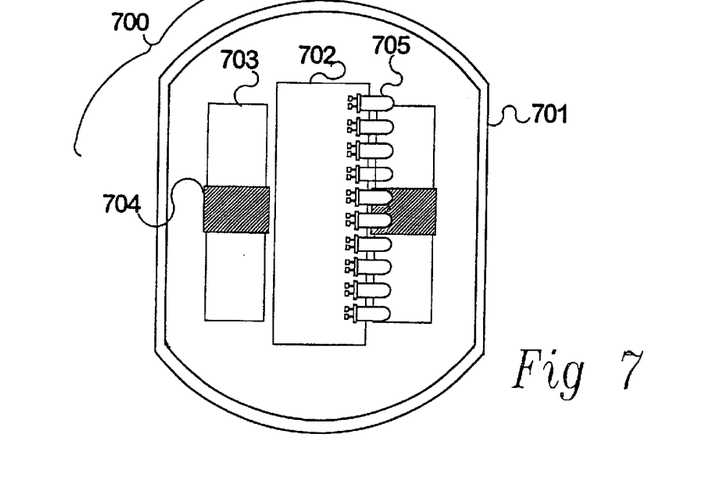
FIG. 7: shows the interior of a roadway marker incorporating a pair of ferrite strips as pickup devices to collect inductive power.

In FIG. 7, we show a highway marker 700 from above. The casing 701 encloses a pair of ferrite cores 703 (only one core and coil is labelled) which are on each side of a printed-circuit board 702 bearing the circuit of FIG. 6 and along one edge a row of light-emitting diodes 705. We have not also illustrated retro-reflectors in this diagram, but they may be interspersed with the diodes 705.

Figure 8:
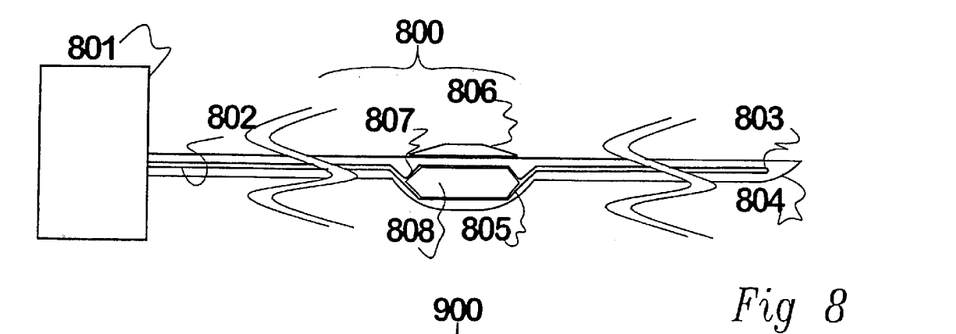
FIG. 8: shows the disposition of the primary inductive loop in an installation.
Figure 9:
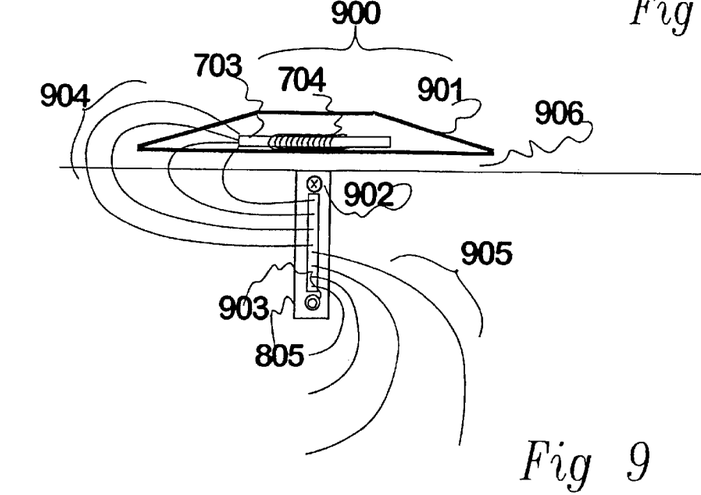
FIG. 9: shows the flux about the primary conductors, entering the ferrite mainly at its ends.

FIG. 8 shows part of a roadway installation in side view. A power supply 801 puts power into a loop of cable forming a primary inductive loop. In the portions where the two conductors are close together (802) the flux tends to cancel out and the cable radiated little flux. Hence it may be elongated. At positions (803) where a lamp unit (804) may be placed, the cable is spread apart, preferably using a spreader (805) to maintain spacing during and after installation. The end of the loop remote from the cable is shown at 806.

If the power supply is a resonant power supply, and this type of energisation is economical and, by energising the cable with a sine wave, minimises problems of radiation of radio or electromagnetic energy, it is preferable to use litz wire for the cables. We prefer 4 mm$^2$ litz wire. Our typical resonant power supplies are run at 24 volts, which allows for battery backup and safe running and at 24 volts it can power about a 25 metre long primary inductive pathway, and about 10–14 amperes at a 40 kHz frequency circulates in the cable when in operation. Using a higher voltage allows longer primary inductive loops to be used. If an unusually short cable is used, its inductance may be boosted with a lumped inductance, rimmed to make the installation resonate at 40 kHz.

EXAMPLE 3

Our basic system may be embellished by providing for control of the output of the lamp units, either as a group or individually. Preferably this control is more than simply turning the entire set on or off. One approach is to provide each lamp unit in an installation with control electronics that can detect signals of some sort radiated from the primary conductor cable, because this cable is already functionally connected with all operational lamps.

It is possible to superimpose a message over the primary current, in the form of momentary variations of the amplitude of the primary current, which can be sensed within the or each lamp unit as changes in the operational settings of the regulating mechanism. Coding of the amplitude could follow any convenient code, such as the letters of the ASCII coding system, or Morse code, or some other system such as those used in serial bus digital control, such as the I$^2$C bus. This requires a small amount of complexity in each lamp unit that is capable of being addressed. Each "bit:" of the code would have to be sufficiently long in time to "catch" any lamp unit that at the time has shorted its inductive pickup coil, unless a separate data sensing arrangement was used. Information may be carried within a carrier frequency, separate from the frequency of the power for inductive transfer.

Variations of the phase of the primary current are another way to transmit data.

A cheap way of addressing lamp units is to make a variety of units each having a different resonant frequency. Then only those lamp unit that resonate at the frequency of the transmitted power can operate. If a resonant power supply is used, it might be provided with subsidiary switchable resonating capacitors. By this means it is possible to create a travelling wave of flashing lights, for decorative or directional purposes.

FIRE EGRESS INDICATION LAMPS

This is—as a preferred example—a fire-exit indicating network, which when energised provides a chain of illuminated beacons 203, 204 along the floor of a building. The beacons are intended to direct people to the nearest fire exit. In addition to the basic system above, we would usually include means to supply the power from batteries as in an emergency the mains power is likely to fail, and means to cause the power supply to start up when an emergency condition, such as a blackout at night, and/or a fire alarm is in effect. The energising cable 201 is preferably embedded into a concrete or similar floor, and may be embedded at a depth of several inches as our inductive power transfer system is a loosely coupled one that tolerates spacings of that order. The energising cable is placed along the floors of passageways that lead to fire exits, preferably along the centre lines of the passageways. The drive voltage may be as low as 12 volts, depending on the power required.

The lamp units are preferably light-emitting diodes or the like, embedded in wear-resistant transparent or translucent housings so that they remain capable of emitting visible light even after years in position. Preferably the lit lamps display a clearly understood and preferably standardised direction so that people in panic are not confused. Optionally the lamps or the power supply may be operated in an attention-getting flashing mode and optionally the lamp units may also generate audible signals. In fact, they may also generate vibrations so that blind people can locate and use the indicators. Our preferred lamp units may have bases about 10 cm square—containing the resonant pickup coil—with a height of perhaps 5 mm, and have a top made of a wear-resistant material such as polycarbonate or even glass. They may include other electronic devices such as a voltage sensor and a switch to short-circuit the coil when the voltage rises above a threshold. (This means of regulation limits the tendency of a resonant secondary to develop a large circulating current which tends to block the primary current from reaching past this secondary coil to reach others. On the other hand, as this application of inductive power transfer has substantially constant operating parameters, and it may be preferable to select a lamp unit for a particular position from a range of units having various brightnesses—actually flux collection and conversion capabilities.

These illuminated display devices may be glued onto a carpet, or let into holes cut in a carpet, or glued onto a hard surface, and need no electrical connections. Thus replacement of damaged or displaced units is not a skilled job. Typical buildings where the devices may be used include hotels, schools, hospitals, auditoriums, and other public buildings.

Advantages of this device include that the system is located on or in floors where it is unlikely to be damaged until after surrounding structures have been destroyed, and the floor location is compatible with people who are keeping low or even forced to crawl in order to avoid smoke and fumes. (Conventional practices of placing often illuminated EXIT signs high up above doorways can lead to obscuration by smoke).

The device has inherently a high reliability because the destruction of any lamp unit by flames or the like does not compromise the remainder—rendering its pickup coil an open circuit or a short circuit does not substantially affect the primary current and so the remainder of the lamp units may remain lit.

Furthermore the lamp units themselves are electrically isolated, and the energising power supply is preferably provided with fault detection means so that it provides no electrical hazards in itself.

A variant of this device can be used in theatres, hotels, houses and the like, and would be energised steadily or on pressure on a sensing pressure pad, to better indicate the positions of stairs in the dark.

ROADWAY—DETAILS

A similar arrangement can be used on roadways to better indicate lanes routes hazards and other events to motorists. A particular application is in providing warnings at pedestrian crossings. In the pedestrian crossing application, the power supply is connected to a reliable source of AC power and is arranged to be energised when (for example) a person steps onto a contact pad at the kerbside, or when a conventional button is pushed. The energising cables are placed along selected patterns and may be embedded within slits cut with a diamond saw. As our inductive power transfer system uses only loose coupling, the cables may be several centimetres deep and even the later addition of further road surfaces will not affect coupling of power from the cables. The cables are preferably sealed in place, using a suitable adhesive or the like so that the installation is substantially permanent.

Figure 2:
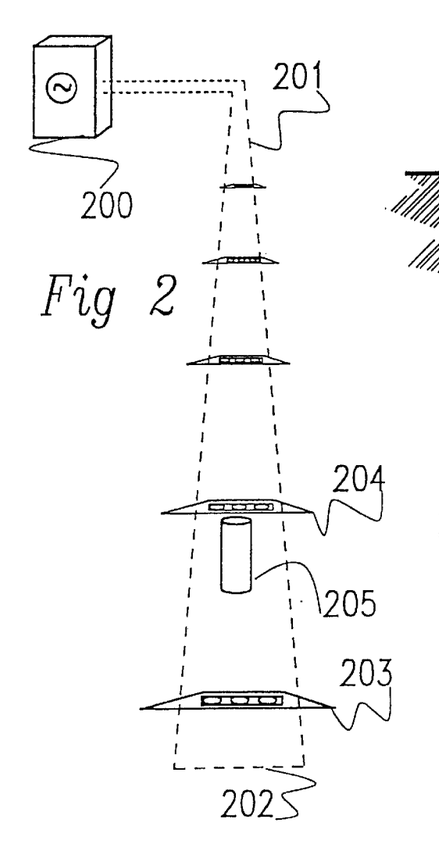
FIG. 2: is a perspective view of a row of lights energised inductively by alternating current in a concealed cable.
Figure 3:
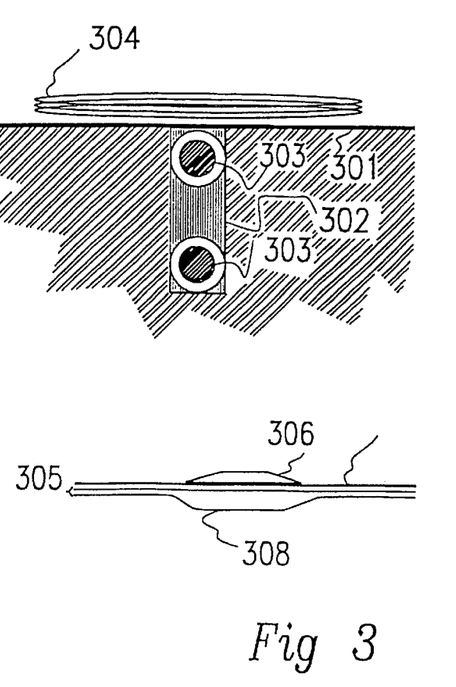
FIG. 3: illustrates energisation using a cable carried within a single vertical slit.

The preferred slit dimensions for slits cut into roadways is 5 mm wide by 10 mm deep, rather than the more idealised parallel pair of slits shown in FIG. 2. (Roads tend to crack and chip between parallel, close slits). Therefore we have also made a modified arrangement in which one of the pair of wires forming the cable is above the other, as shown in FIG. 3, and optionally in order to enhance the flux at the position of a lamp we make the slit deeper at that site and push one conductor further away from the road surface at that point.

Preferably the cables are energised from a power supply operating at 12 or 24 volts, compatible with storage batteries fed from a wind generator or solar cells, although a higher voltage may be needed to inject resonant power into a longer run of cable, particularly if the more efficient litz wire is not available.

The lamp units may be built into the existing "cats-eye" housings widely used on roadways to demarcate lanes by means of retro-reflective inserts. Glues or other means to mount these devices are well known and the dimensions of existing housings are adequate for housing the power pickup coils, control electronics, and lamps. In order to catch drivers' attention we expect that high-intensity beams from light-emitting diode lamps will be used, aimed towards oncoming traffic. These lamps may be pulsed in a synchronised, attention-gathering manner by for example pulsing the power supply on and off. As the preferred resonant frequency is high, the decay time for power is small. Forty cycles of 40 KHz power=1 millisecond. Alternatively the internal regulator within each housing may be arranged to operate in a cyclic manner, although this may not give as clear a signal of danger to an approaching driver.

In the pedestrian crossing application, a vandal-proof warning device would preferably comprise (a) a sensing pad for detecting a waiting pedestrian, a sequencer to first energise the array of warning lamps for a suitable time, and then means to energise a "Cross now" or "Walk" signal of some type which may be (a) conventional illuminated signs, (b) audible, and/or (c) made of further lamps on the roadway, this time over the crossing itself and orientated so that they are visible to the pedestrian.

In cases where the currents in the buried cables are likely to affect inductive sensors used for controlling automatic traffic lights, the operating frequency can be selected to be separated from that used by the traffic light, and the relatively low harmonic content of the resonant power means that a simple trap tuned to the fundamental frequency should reject any interference to the traffic light sensor.

In case further buried cables are used to provide power to moving vehicles according to our inductive power transfer principles, a separation in frequency should minimise any cross-interference between cables or affecting the pickup coils. It may well be preferable to adopt a different frequency of perhaps 40 KHz for these low-power lighting devices and run the vehicle power cables at 10 KHz, whereupon the tuned resonant circuits of the lighting devices should not develop any significant power when exposed to magnetic flux at a 10 KHz cycle rate.

VARIATIONS

In order to arrange for switching of lanes on a roadway, for example at a bridge where diurnal reversals in the flow of traffic promote the use of more lanes in one direction than another at one time, lane switching may be accomplished by linear arrays of illuminated housings which are laid on the road along predetermined lines or courses, and illuminated as required in order to steer cars into lanes.

These types of lights can also be used to demarcate sharp corners and the like and enhance areas of poor visibility. Here they have the advantage over conventional reflectors that by generating their own light they are effective outside (and particularly to either side of) the region illuminated by the headlights of a car. Preferably warning lights intended for motorists are intermittently energised by the approach of a motor vehicle, using a pressure pad or a proximity sensing device so that they can be maintained from a rechargeable storage battery with a solar cell as a source of power. When in operation, the bands of light emitted from the arrays of lamp units may extend far beyond the range of the driver's headlights.

UNDERWATER VARIATIONS

As inductive power transfer is inherently unaffected by non-magnetic materials that may appear or disappear in the gap, it may be used under water. Accordingly a series of housings containing lamps may be placed on the bottom (and sides, and edges) of a swimming pool to indicate lanes, and energised as required by buried cables concealed in the substance of the pool floor. These lamp units may be fixed in place, and various combinations energised by selecting particular runs of cable for various combinations of lamp unit spacing. Alternatively they may be clipped into retaining clips as and when required. Magnets, particularly magnets formed from ferrites, may be used to temporarily locate lamp units. Adjacent, magnetically soft ferrites may be included to act as flux concentrators.

OPTIONS

A light housing could be provided with more than one pickup coil and ancillary light sources, so that by changing the frequency of the power in the primary cable, different colours of light (for example) could be produced. Power modulation may also be arranged to select different lamps. Light emitting diodes are at present available in red, orange, yellow, green and blue, although the latter two are not particularly bright. Laser diodes of various visible colours may soon become cheap enough for use in this application, where their enhanced beam-forming ability will aid in the detection of these lights at a distance. Light-emitting diodes have an advantage in that their ON-voltage can be used to provide a degree of intrinsic regulation as shown in FIGS. 3 and 4 where even the rectifier can be deleted if a second string of LEDs with the opposite polarity is placed across the first string.

As the light housings will generally be fixed it is possible to extend the cable length by bringing the wires close together unless, at the site of a lamp, they are spread apart so that the magnetic field increases. To further enhance the field, a loop can be constructed in the primary cable, or a magnetically permeable coupler such as a ferrite can be used.

In situations where lateral variations in lighting may extend beyond the "tram-track" layout of primary coils, one wire may be placed above the other, providing a more diffuse field. If this field is weaker, a ferrite flux concentrator may be provided to increase the power available within the secondary device.

Movable lights may be mounted on a light track or on a surface such as a wall, ceiling, or table in such a way that they can be held in position without requiring direct electrical contact with the power source. In one example wall mountable lights can be mounted in one or more plastic channel members attached to the wall and may be allowed to slide along a channel member to a desired position whilst picking up inductive power from a primary circuit embedded in the wall or in the base of the channel member. As the attachment of the light to the surface does not require any direct electrical contacts whether sliding or stationary it is possible to adopt any number of different attachment means for the location or placement of the lights. The lights may take any desired shape or design.

In the case of a photographic studio the lights may have a base containing the resonant pick-up and an arm or stem extending therefrom which a suitable reflector or light housing is mounted and containing the light source. In such a case it is preferable to position the primary resonant circuit (or circuits) in a sinuous pattern in the wall or ceiling so that the lamp bases can be placed anywhere on the surface and still receive enough resonant power to activate its light source. An advantage of placing the primary cables in a "slit configuration" as previously described is that the primary cables generate an external alternating magnetic field which is predominately parallel to the surface of the substrate, allowing the lamp base to be moved from side to side of the "slit" containing the pair of cables and still receive enough power for its light source.

ADVANTAGES

Inductively powered lamp units in accordance with this invention have a variety of uses where direct contact between the power cables and the lamp units is undesirable. Examples of such uses include lights used in or near water such as in swimming pools or areas where people work in contact with water, lights used in corrosive environments or where conductive fluids are likely to occur, lights used in mines and in operating theatres or in certain other industrial sites where flammable powders, gases, or the like are found, and lights used in roadways, or where the lights need to be moved relative to the power supply (eg in display areas or in photographic studios).

Finally, it will be appreciated that various alterations and modifications may be made to the foregoing without departing from the scope of this invention as set forth.

What is claimed is:

1. A method of supplying electricity to a discrete lamp unit, comprising the steps of:

forming a hole in stationary material;

positioning in the hole wiring capable of generating an alternating inductive magnetic field outside the hole when an alternating electrical current is passed through the wiring;

covering the wiring in the hole; and positioning remote from the wiring the discrete lamp unit which is adapted to provide illumination when energized inductively with an induced alternating electrical current generated by the inductive magnetic field.

2. The method as claimed in claim 1, including the steps of forming the hole as an elongate groove, positioning the wiring inside the groove so that, in use, the alternating inductive magnetic field is elongate and extends outside the groove.

3. The method as claimed in claim 2, including the steps of positioning outside the groove a row of said discrete lamp units.

4. The method as claimed in claim 3, including the step of forming the groove along a track selected from the group consisting of a road, a pathway, an aircraft runway, a quay, a corridor, a pedestrian crossing, a swimming pool wall and a swimming pool floor.

5. A loosely coupled, self-illuminated cat's eye, roadway marking system, comprising:

a power supply for producing an alternating current at at least one selected frequency;

an inductive power distribution cable connected to the power supply, said inductive power distribution cable being a loop with two conductors positioned one above the other in a substantially vertical slit in a roadway to be marked; and at least one road warning lamp unit located above or close to said power distribution cable, each lamp unit comprising, a housing having at least one window for transmitting light, one or more light emitting diodes for radiating light, and collection means to collect loosely coupled inductively transferred power from an external alternating primary magnetic field from the inductive power distribution cable operating at the at least one selected frequency, said collection means comprising a resonant circuit within the housing having a resonant period corresponding to a selected frequency and including at least one inductance and at least one capacitance, the at least one inductance having a winding adapted to be intersected by a portion of the alternating magnetic field and thereby being for collecting power as a secondary current, means for limiting the maximum amount of secondary current circulating in the resonant circuit, means for transferring power at an output from the resonant circuit to the lamp or lamps, and means for controlling the power provided to the lamp or lamps.

6. The loosely coupled roadway marking system as claimed in claim 5, wherein the cable is spread apart at selected locations where lamp units are to be located.

7. The loosely coupled roadway marking system as claimed in claim 6, wherein the power supply is capable of being controlled by control signals superimposed from time to time on the alternating magnetic field radiated by the primary conductor, and the at least one road warning lamp unit is capable of detecting said control signals and varying its light output in response thereto.

* * * * *